United States Patent
Street et al.

(10) Patent No.: US 12,030,561 B2
(45) Date of Patent: Jul. 9, 2024

(54) DEBRIS MANAGEMENT VEHICLE

(71) Applicant: THE TORO COMPANY, Bloomington, MN (US)

(72) Inventors: Benjamin Allan Street, Northfield, MN (US); Jeremy J. Tate, Beatrice, NE (US)

(73) Assignee: THE TORO COMPANY, Bloomington, MN (US)

( * ) Notice: Subject to any disclaimer, the term of this patent is extended or adjusted under 35 U.S.C. 154(b) by 256 days.

(21) Appl. No.: 17/074,359

(22) Filed: Oct. 19, 2020

(65) Prior Publication Data
US 2021/0114673 A1 Apr. 22, 2021

Related U.S. Application Data

(60) Provisional application No. 62/923,761, filed on Oct. 21, 2019.

(51) Int. Cl.
*B62D 51/02* (2006.01)
*A01G 20/47* (2018.01)
(Continued)

(52) U.S. Cl.
CPC ............ *B62D 51/02* (2013.01); *A01G 20/47* (2018.02); *B08B 5/02* (2013.01); *B08B 13/00* (2013.01); *E01H 1/0809* (2013.01); *F04D 25/02* (2013.01); *F04D 29/403* (2013.01); *E01H 2001/0881* (2013.01); *F16H 7/02* (2013.01); *G05G 1/01* (2013.01); *G05G 1/025* (2013.01)

(58) Field of Classification Search
CPC .......... B62D 51/02; A01G 20/47; B08B 5/02; B08B 13/00; E01H 1/0809; E01H 2001/0881; F04D 25/02; F04D 29/403; F16H 7/02; G05G 1/01; G05G 1/025
See application file for complete search history.

(56) References Cited

U.S. PATENT DOCUMENTS 5,735,018 A * 4/1998 Gallagher ............. E01H 1/0809
15/328
6,253,416 B1 * 7/2001 Lauer ..................... A01G 20/47
15/361
(Continued)

FOREIGN PATENT DOCUMENTS

CA 2987275 A1 * 12/2016 ............. A01G 20/47

OTHER PUBLICATIONS

Briggs & Stratton, LLC., "Billy Goat Hurricane Stand-On Blower Adds the Next Level of Cleanup Productivity to its Blower Lineup" Aug. 18, 2018; Retrieved from the Internet on Jan. 25, 2021: billygoat.com/na/en_us/news-room/browse/billy-goat-hurricane-stand-on-blower-adds-the-next-level-of-cleanup-productivity-to-its-blower-lineup.html. 3 pages.
(Continued)

*Primary Examiner* — Marc Carlson
(74) *Attorney, Agent, or Firm* — Mueting Raasch Group (57) ABSTRACT

A debris management vehicle is disclosed that has a vehicle frame and a fan assembly coupled to the vehicle frame. The fan assembly has a rotor axis oriented obliquely to a horizontal plane. A nozzle defines a nozzle inlet and a nozzle outlet. The nozzle inlet is in fluid communication with an outlet of the fan assembly. The nozzle outlet is rotatable about a nozzle axis that is orthogonal to the horizontal plane.

30 Claims, 8 Drawing Sheets

(51) Int. Cl.
  *B08B 5/02* (2006.01)
  *B08B 13/00* (2006.01)
  *E01H 1/08* (2006.01)
  *F04D 25/02* (2006.01)
  *F04D 29/40* (2006.01)
  *F16H 7/02* (2006.01)
  *G05G 1/01* (2008.04)
  *G05G 1/02* (2006.01)

(56) References Cited

U.S. PATENT DOCUMENTS

| | | | |
|---|---|---|---|
| 8,056,180 B2* | 11/2011 | Iacona | A47L 5/14 15/345 |
| 8,262,104 B2 | 9/2012 | Kallevig et al. | |
| 8,387,205 B2* | 3/2013 | Weihl | A01D 42/06 15/347 |
| 9,560,810 B2 | 2/2017 | Kinkead et al. | |
| 9,986,692 B2 | 6/2018 | Kinkead et al. | |
| 10,694,673 B2* | 6/2020 | Berglund | A01D 43/077 |
| 2003/0082016 A1* | 5/2003 | Eavenson, Sr. | A01G 20/47 406/38 |
| 2012/0234412 A1* | 9/2012 | Prager | A01G 20/47 137/565.01 |
| 2015/0190021 A1* | 7/2015 | Barkow | E01H 1/0809 15/405 |
| 2016/0113207 A1* | 4/2016 | Shumaker | B08B 5/02 15/405 |
| 2016/0150922 A1* | 6/2016 | Restall | A01G 20/47 29/428 |
| 2016/0152256 A1* | 6/2016 | Restall | E01H 1/0809 137/899 |
| 2017/0112071 A1* | 4/2017 | Shumaker | E01H 1/0809 |
| 2018/0103810 A1* | 4/2018 | Restall | A47L 5/14 |
| 2020/0084978 A1* | 3/2020 | Weihl | A01G 20/47 |
| 2020/0120881 A1* | 4/2020 | Hall | F04D 29/464 |
| 2020/0296893 A1* | 9/2020 | Bohrer | A01G 20/47 |
| 2020/0331037 A1* | 10/2020 | Wooden | E01H 1/0809 |

OTHER PUBLICATIONS

The Toro Company, "Blower Kit: GrandStand Multi Force Mower" Operator's Manual, Model No. 78593—Serial No. 400000000 and Up. Form No. 3422-369 Rev A. Available at least as early as Oct. 20, 2019. 20 pages.

IDS NPL Document 1, Screen captures from YouTube video clip entitled "SCAG Windstorm Stand On Blower | New Leaf Blower for 2019 (2018 GIE+EXPO)" 1 page, uploaded Oct. 25, 2018. by user "Copper Creek Cuts Lawn Care". Retrieved from Internet: https://www.youtube.com/watch?v=wKyIEUaZMjk.

IDS NPL Document 2, Screen captures from YouTube video clip entitled "Turbine Leaf & Debris Blower | Grashopper (sic) Mowers" 1 page, uploaded May 18, 2009 by user "grasshoppermower." Retrieved from the Internet: https://www.youtube.com/watch?v=Js_RcB01beo.

The Toro Company, "Groundsmaster 7200 and 7210 Series Traction Unit, Model No. 30487—Serial No. 315000001 and Up; Model No. 30487N—Serial No. 315000001 and Up; Model No. 30495—Serial No. 315000001 and Up," Operator's Manual, Form No. 3390-468 Rev A, 2014, 56 pages.

The Toro Company, "Sand Pro 2040Z Traction Unit, Model No. 08706—Serial No. 314000001 and Up; Model No. 08706TC—Serial No. 314000001 and Up," Operator's Manual, Form No. 3396-642 Rev A, 2015, 60 pages.

* cited by examiner

DEBRIS MANAGEMENT VEHICLE

This application claims the benefit of U.S. Provisional Application No. 62/923,761, filed Oct. 21, 2019 which is hereby incorporated by reference in its entirety.

TECHNOLOGICAL FIELD

Embodiments of the present disclosure generally relate to maintenance vehicles. More particularly, embodiments of the present disclosure relate to a debris management vehicle.

BACKGROUND

Debris blower assemblies are known for clearing or blowing debris, such as leaves, grass clippings, aeration cores, trash, etc., off of various ground surfaces, such as roadways and other maintained paved areas, cart paths, fairways and greens of golf courses, other turf areas and the like. Debris blowers generally use a fan to generate airflow and expel air through a nozzle. Debris blowers can be incorporated in maintenance vehicle structures and, as the vehicle is driven over the ground surface that is to be cleared, the operator can direct the nozzle outlet of the debris blower in a desired radial direction, which directs the debris in that general radial direction. The operator can direct the nozzle outlet through one or more controls on the debris blower, which can be located, for example, on a dashboard of such a vehicle. The control generally is configured to direct the rotation of the nozzle based on user input. The configuration of the nozzle and the fan on the vehicle can impact the effectiveness and utility of such a maintenance vehicle.

SUMMARY

Some embodiments of the technology disclosed herein relate to a debris management vehicle. The vehicle has a vehicle frame and a fan assembly coupled to the vehicle frame, where the fan assembly has a rotor axis oriented obliquely to a horizontal plane. The vehicle has a nozzle defining a nozzle inlet in fluid communication with an outlet of the fan assembly and a nozzle outlet, where the nozzle outlet is rotatable about a nozzle axis that is orthogonal to the horizontal plane.

In some such embodiments the vehicle has a standing platform connected to the vehicle frame, where the standing platform adapted to support a standing operator. Additionally or alternatively, the fan assembly has a fan housing coupled to the vehicle frame, where the nozzle is rotatably disposed relative to the fan housing. Additionally or alternatively, the fan housing has a central axis that is coaxial with the rotor axis of the fan assembly. Additionally or alternatively, the vehicle has a mule drive operatively coupled to the fan assembly.

Additionally or alternatively, the vehicle has a first handle and a first actuator disposed on the first handle, where the first actuator is manually engageable and is configured to actuate rotation of the nozzle about the nozzle axis. Additionally or alternatively, the vehicle has a belt drive in operative communication with the first actuator, where the belt drive is configured to selectively rotate the nozzle from a first position to a second position. Additionally or alternatively, the belt drive is disposed about the nozzle to frictionally engage the nozzle. Additionally or alternatively, the vehicle has a limiting element that is configured to restrict rotation of the nozzle to a range from the first position to the second position.

Additionally or alternatively, the vehicle has a second handle and a second manually engageable actuator disposed on the second handle, where the second actuator is configured to selectively actuate rotation of the nozzle about the nozzle axis. Additionally or alternatively, the first actuator is configured to selectively actuate rotation of the nozzle in a first direction about the nozzle axis and the second actuator is configured to selectively actuate rotation of the nozzle in a second direction about the nozzle axis. Additionally or alternatively, the nozzle outlet is configured to rotate 90 degrees about the nozzle axis. Additionally or alternatively, the fan assembly has an axial fan. Additionally or alternatively, the fan assembly has an impeller.

Some embodiments relate to a debris management vehicle having a vehicle frame. A first handle and a second handle are coupled to the vehicle frame, where the first handle and second handle are translatable relative to the vehicle frame. A first drive wheel and a second drive wheel are each disposed on the vehicle frame, where translation of the first handle controls the first drive wheel and translation of the second handle controls the second drive wheel. A fan assembly is coupled to the vehicle frame. The fan assembly has a fan housing and a fan disposed in the fan housing, where the fan housing defines a fan outlet. A nozzle is coupled to the fan housing. The nozzle defines a nozzle inlet and a nozzle outlet. The nozzle inlet is in fluid communication with the fan outlet and the nozzle is rotatable about a nozzle axis orthogonal to a horizontal plane. A first manually engageable actuator is disposed on the first handle. The first actuator is configured to selectively actuate rotation of the nozzle about the nozzle axis.

In some such embodiments, the vehicle has a second manually engageable actuator disposed on the second handle, where the second actuator is configured to selectively actuate rotation of the nozzle about the nozzle axis. Additionally or alternatively, the first actuator is configured to selectively actuate rotation of the nozzle in a first direction about the nozzle axis and the second actuator is configured to selectively actuate rotation of the nozzle in a second direction about the nozzle axis. Additionally or alternatively, the vehicle has a standing platform connected to the vehicle frame, where the standing platform configured to support a standing operator.

Additionally or alternatively, the fan has rotor axis oriented obliquely to the horizontal plane. Additionally or alternatively, the vehicle has a mule drive operatively coupled to the fan. Additionally or alternatively, the nozzle is configured to rotate 90 degrees. Additionally or alternatively, the nozzle is rotatably disposed relative to the fan housing. Additionally or alternatively, the fan has a rotor axis and the fan housing has a central axis that is coaxial with the rotor axis of the fan. Additionally or alternatively, the vehicle has a belt in operative communication with the first actuator, where the belt is configured to selectively rotate the nozzle from a first position to a second position. Additionally or alternatively, the belt is disposed about the nozzle to frictionally engage the nozzle. Additionally or alternatively, a limiting element is configured to restrict rotation of the nozzle to a range from the first position to the second position. Additionally or alternatively, the fan is an axial fan. Additionally or alternatively, the fan has an impeller.

Some embodiments relate to a debris management vehicle having a vehicle frame. A first drive wheel and a second drive wheel are each coupled to the vehicle frame. A fan assembly is coupled to the vehicle frame, where the fan assembly has a fan housing defining a fan outlet, an impeller having a rotor axis oriented obliquely to a horizontal plane, and a mule drive operatively coupled to the impeller. A nozzle is coupled to the fan assembly. The nozzle defines an inlet in fluid communication with the fan outlet and a nozzle outlet. The nozzle is rotatable relative to the fan housing about a nozzle axis orthogonal to a horizontal plane. A belt drive assembly is configured to selectively rotate the nozzle between a first position and a second position, where the belt drive assembly has a belt disposed about the nozzle. The belt is in frictional engagement with the nozzle between the first position and the second position. A first handle is coupled to the vehicle frame, where the first handle is in operative communication with the first drive wheel. A first manually engageable actuator is disposed on the first handle, where the first actuator is configured to selectively actuate rotation of the nozzle about the nozzle axis via the belt drive assembly. A second handle is coupled to the vehicle frame, where the second handle is in operative communication with the second drive wheel. A second manually engageable actuator is disposed on the second handle, where the second actuator is configured to selectively actuate rotation of the nozzle about the nozzle axis via the belt drive assembly. The first actuator is configured to selectively actuate rotation of the nozzle in a first direction about the nozzle axis and the second actuator is configured to selectively actuate rotation of the nozzle in a second direction about the nozzle axis.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. These terms are used only to simplify the description, however, and are not meant to limit the interpretation of any embodiment described.

Figure 1A:
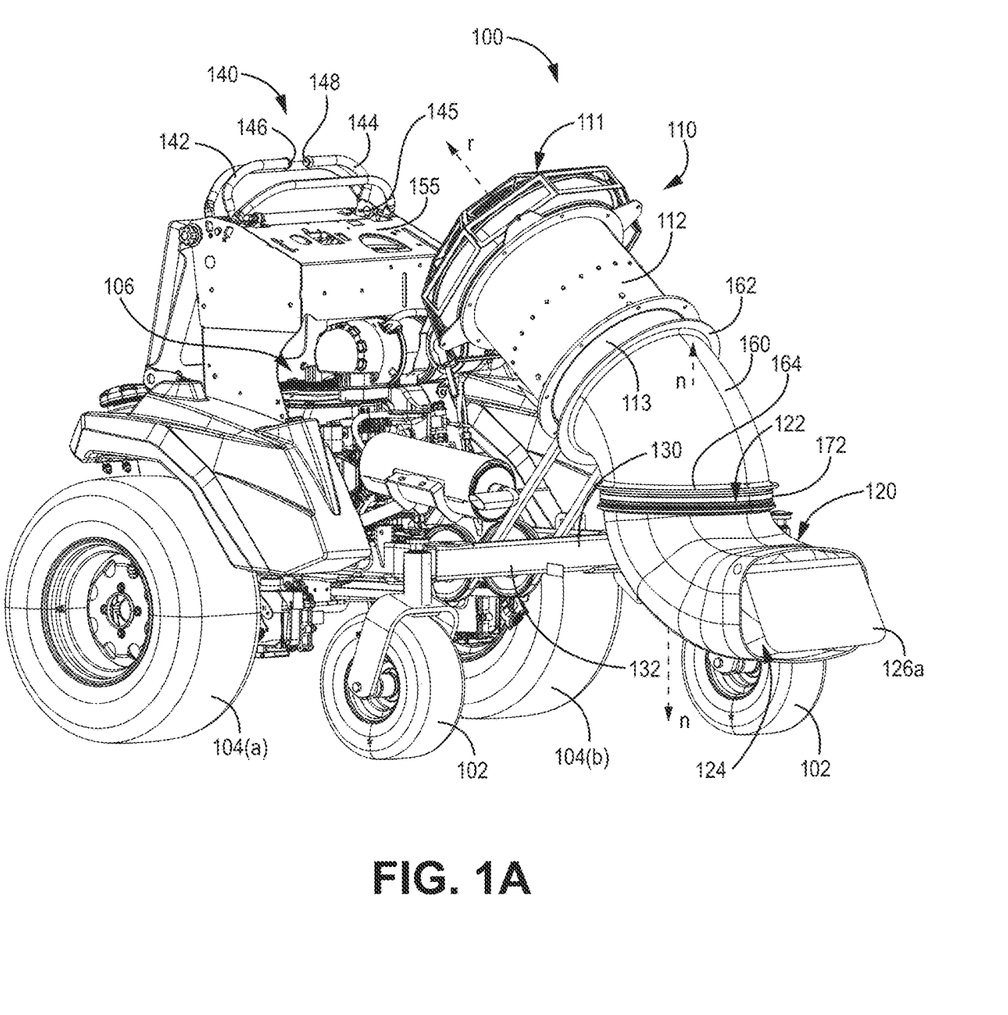
FIG. 1A is a perspective view of an example vehicle consistent with some embodiments.
Figure 2:
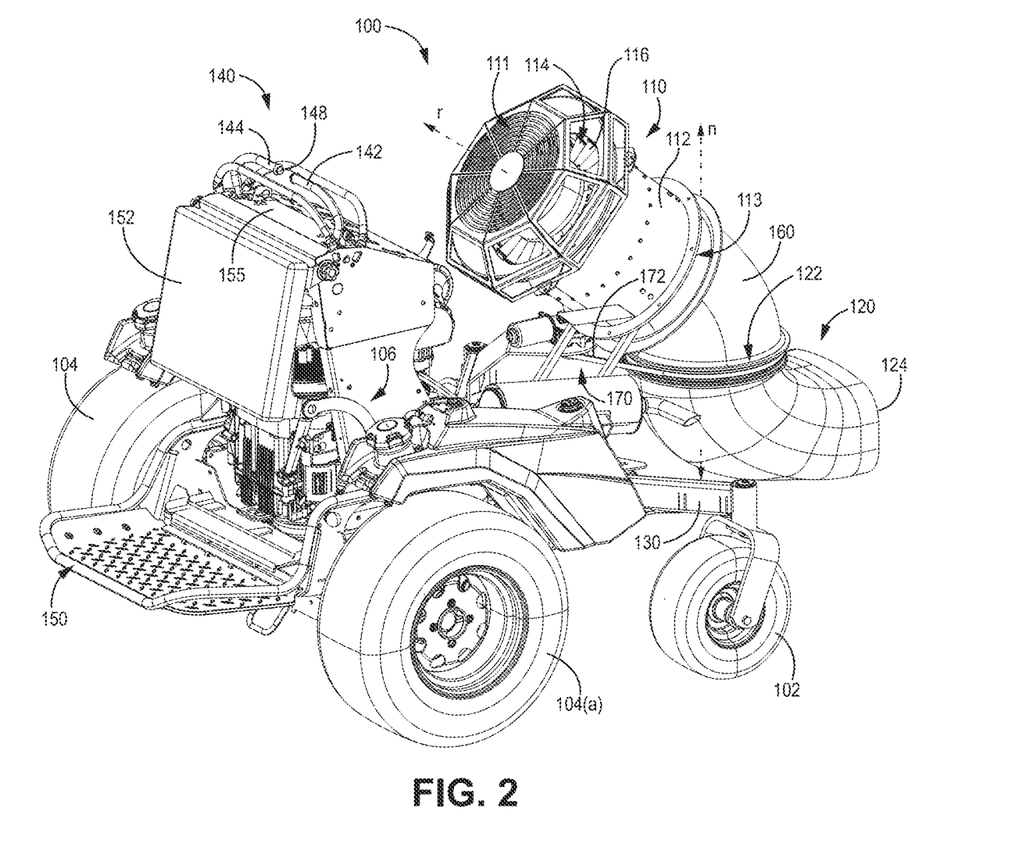
FIG. 2 is a second perspective view of the example vehicle of FIG. 1C.
Figure 3:
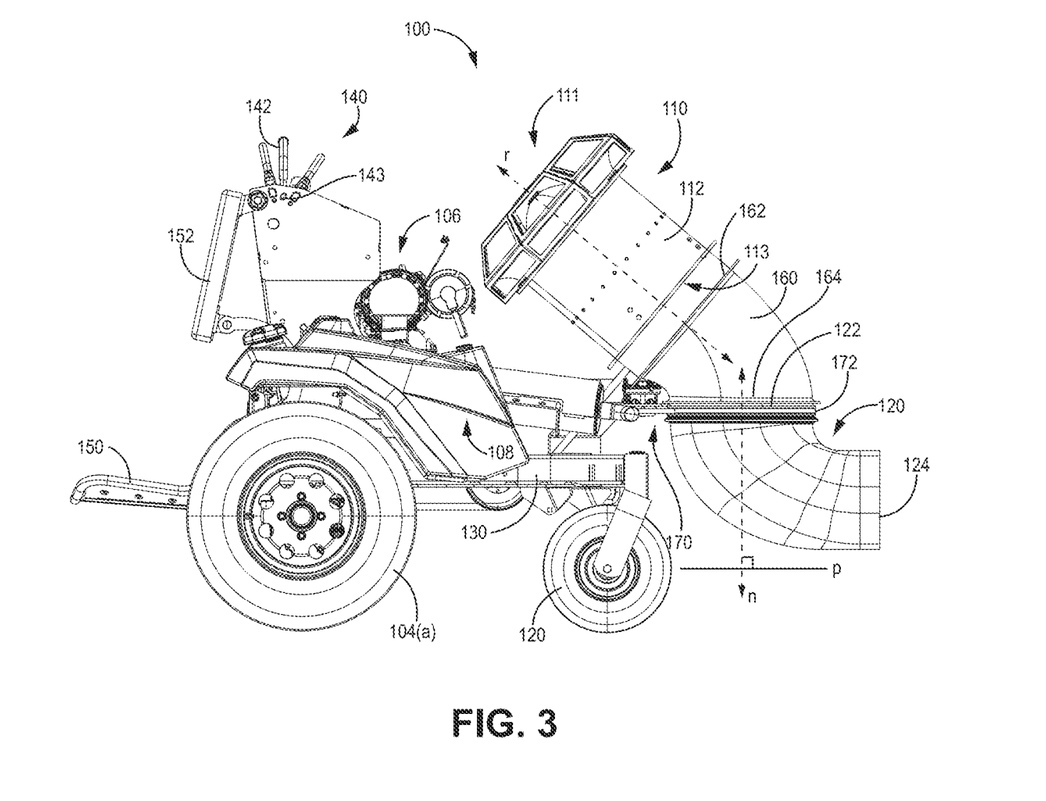
FIG. 3 is a side view of the example vehicle.

FIG. 1A is a first perspective view of an example debris management vehicle 100 consistent with some embodiments, FIG. 2 is a second perspective view of the example vehicle 100, and FIG. 3 is a side view of the example vehicle 100. The vehicle 100 generally has a vehicle frame 130, a fan assembly 110 coupled to the vehicle frame 130, and a nozzle 120 coupled to the vehicle frame 130.

The vehicle 100 is generally configured to be propelled across the ground surface to engage in grounds maintenance while using at least the fan assembly 110 and the nozzle 120. While the vehicle 100 can incorporate additional grounds maintenance functionality (e.g., aerators, mowers, spreader/sprayers, dethatchers, debris management systems, vacuums, sweepers, general purpose utility vehicles, etc.), the vehicle at least incorporates the fan assembly 110 and nozzle 120 for blowing debris such as leaves, grass clippings, litter, and so on, in a desired radial direction.

The vehicle 100 has a vehicle frame 130 that is configured to be propelled across a ground surface. In particular, ground engaging members 104(a-b) and 102 are disposed on the vehicle frame 130. Here the ground engaging members are drive wheels 104(a), 104(b) and caster wheels 102, but in some embodiments the ground engaging members can be tracks, rollers, and/or other types of wheels. The drive wheels 104(a), 104(b) are generally in communication with a prime mover 106 (e.g., internal combustion engine or electric motor(s)) that is configured to selectively propel the vehicle 100 across the ground.

In the current example, the vehicle 100 is configured as a stand-on vehicle. As such, a standing platform 150 is coupled to the vehicle frame 130. The standing platform 150 is adapted to support a standing operator. A pad 152 can be coupled to the vehicle 100 that is configured to support the legs of standing operator positioned on the standing platform

150. In some embodiments, the standing platform 150 is pivotably mounted on the vehicle 100. The standing platform 150 and/or the thigh pad 152 can be consistent with components disclosed in U.S. Pat. No. 8,262,104, which is incorporated by reference herein. In some other embodiments, the vehicle has a seat to accommodate a seated operator instead of a standing operator.

The vehicle 100 has a control system 140 by which the vehicle 100 is directed and controlled by an operator. The control system 140 can have one or more handles 142, 144 that are configured to selectively propel and direct vehicle propulsion. In some embodiments a first handle 142 and a second handle 144 extend outward from the vehicle frame 130 and are each configured to be manually translated relative to the vehicle frame 130 to control operation of the vehicle 100. In the example depicted, the first handle 142 and the second handle 144 are each manually pivotable about a pivot. The first handle 142 has a first pivot 143 (best visible in FIG. 3) and the second handle 144 has a second pivot 145 (visible in FIG. 1). The first handle 142 and the second handle 144 are manually translated about their respective pivots 143, 145 to control operation of the vehicle 100.

In some embodiments, the first handle 142 and second handle 144 can be considered a twin lever control system, where translation of each handle 142, 144 controls the speed and rotational direction of a corresponding drive wheel 104(*a*), 104(*b*). In this example, translation of the first handle 142 controls a first drive wheel 104(*a*) and translation of the second handle 144 controls a second drive wheel 104(*b*). A drive wheel is considered to "correspond" to a particular handle when it is located on the same side of the vehicle, such that a drive wheel on the right side of the vehicle corresponds to a handle on the right side of the vehicle.

The vehicle 100 can have handles with other configurations as well. In some embodiments, a handle can be configured as a steering wheel. The vehicle 100 can have various alternative and additional controls that can be used by the operator to manipulate function of the vehicle 100. The one or more handles 140, 142 and/or various other controls of the control system 140 are configured to be accessible to the operator positioned on the standing platform 150. In embodiments where the vehicle has a seat instead of a standing platform, the one or more handles 140, 142 and other system controls are configured to be accessible to the seated operator.

In alternative embodiments, the vehicle can be a riding vehicle or a walk-behind vehicle. In some embodiments the vehicle can be non-powered (and, as such, can lack a prime mover 106) and is not self-propelled. In such embodiments, the vehicle can be configured to be attached to a powered vehicle for use in grounds maintenance. For example, the vehicle frame can have a hitch that is configured to detachably couple to a self-propelled vehicle.

The fan assembly 110 is coupled to the vehicle frame 130 and is generally configured to generate airflow that can be used for grounds maintenance. The fan assembly 110 has a fan housing 112 and a fan 114 (FIG. 2) disposed in the fan housing 112. The fan 114 has a rotor axis r. The rotor axis r is oriented obliquely to a horizontal plane p (FIG. 3). The fan assembly 110 is inclined rearwardly (FIG. 3). The orientation of the fan assembly 110 has a number of advantages. For example, the orientation of the fan assembly 110 shifts the center of gravity of the vehicle 100 further rearward and downward than if the fan assembly had a vertical orientation. Also, the oblique orientation of the fan assembly 110 relative to the horizontal plane p (FIG. 3) increases the viewing angle of an operator using the vehicle 100 than if the fan assembly had a vertical orientation. In some alternate embodiments, however, the rotor axis of the fan can be oriented orthogonally to the horizontal plane p such that the rotor axis and the fan itself has a vertical orientation.

The fan housing 112 is generally configured to house the fan 114. The fan housing 112 is coupled to the vehicle frame 130. In various embodiments, the fan housing 112 has a central axis that is coaxial with the rotor axis r of the fan assembly 110. The fan housing 112 defines a fan inlet 111 and a fan outlet 113, where the fan inlet 111 is on the upstream side of the fan assembly 110 and the fan outlet 113 is on the downstream side of the fan assembly 110. An example fan 114 will be discussed in more detail with respect to FIG. 6, further in this document.

A fan control can be in selective manual operable communication with the fan 114 in a variety of embodiments. The fan control can be a button, switch, lever, or the like. For example, the fan control can be disposed on a control panel 155 of the vehicle 100. In some embodiments the fan control can be disposed on the one or more handles 142, 144, where the handles will be described in more detail below. In some embodiments the fan control can engage a clutch 235 (FIGS. 4 and 6) that is in mechanical communication with the prime mover 106 to selectively operate the fan 114. In alternate embodiments, the fan can be engaged via a mechanical belt engagement (e.g., using an idler pulley to tension the belt).

The nozzle 120 is coupled to the fan assembly 110 and is generally configured to direct airflow generated by the fan assembly 110 in a selectable radial direction. In various embodiments, the nozzle 120 is coupled to the fan housing 112. The nozzle 120 is rotatably disposed relative to the fan housing 112. The nozzle 120 has a nozzle inlet 122 in fluid communication with the fan outlet 113 of the fan assembly 110 and a nozzle outlet 124. Generally, the nozzle 120 is configured such that the nozzle outlet 124 is rotatable about a nozzle axis n that is orthogonal to the horizontal plane (best visible in FIG. 3). The nozzle axis n is generally central to the nozzle inlet 122.

Figure 1B:
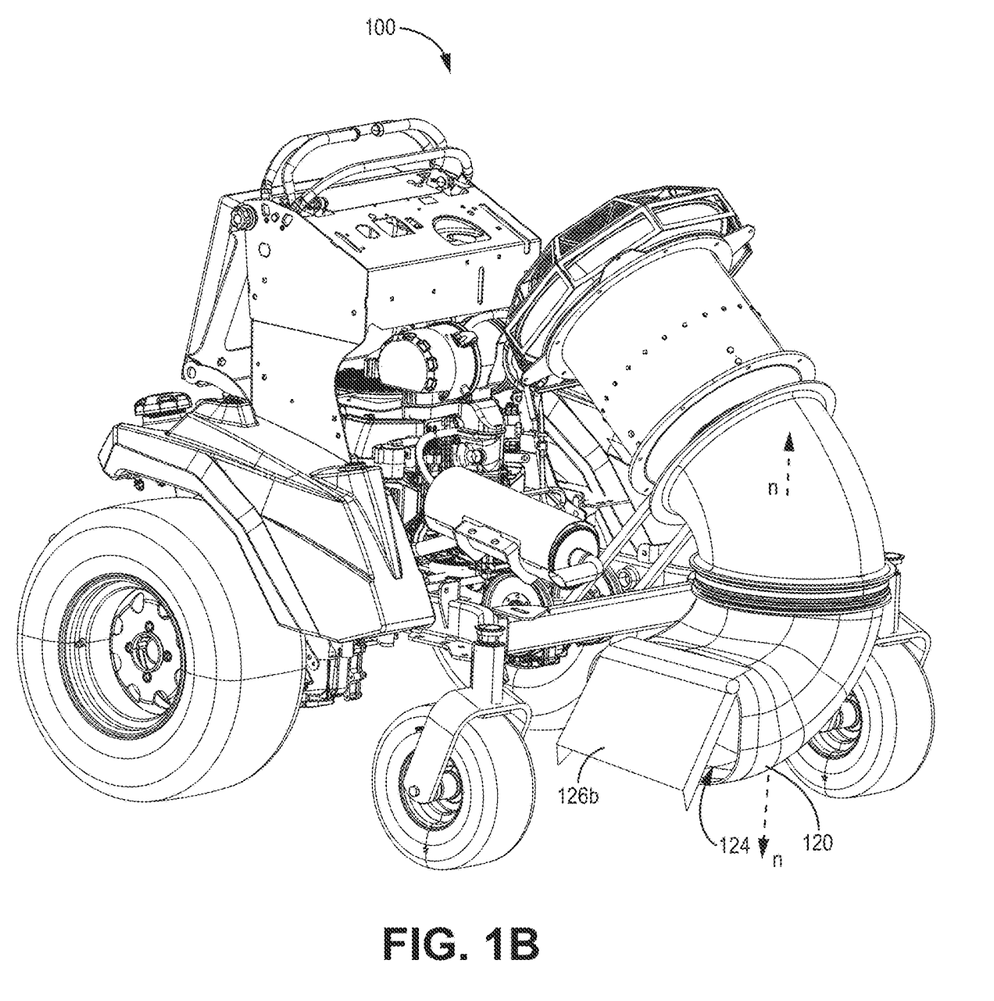
FIG. 1B is a perspective view of another example vehicle similar to the vehicle of FIG. 1A, with a nozzle in a first position.
Figure 1C:
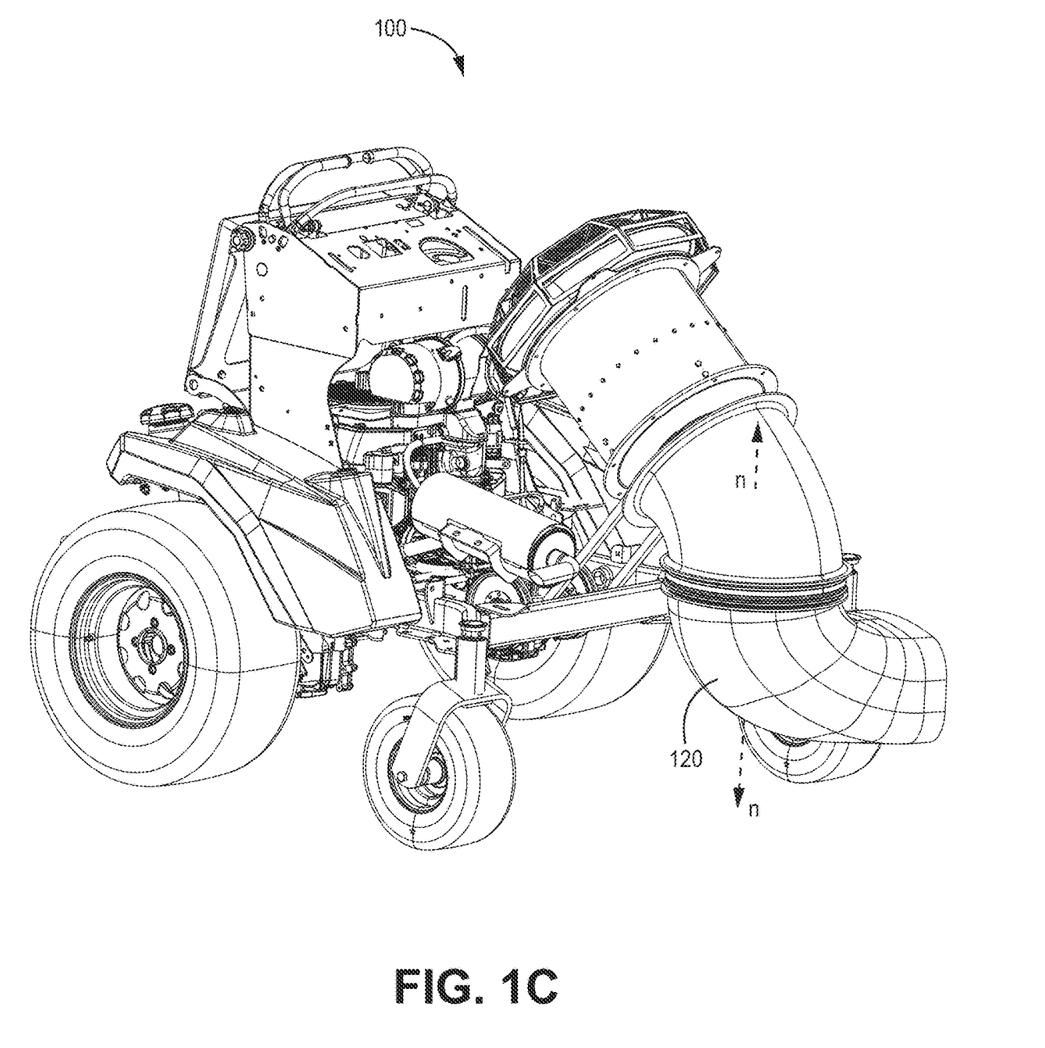
FIG. 1C is a perspective view of another example vehicle similar to the vehicle of FIG. 1A with a nozzle in a second position.

The nozzle 120 and, therefore, the nozzle outlet 124, is configured to rotate from a first position to a second position about the nozzle axis n. The first position can be the nozzle 120 position after a maximum clockwise rotation about the nozzle axis n (as depicted in FIG. 1B, where the nozzle outlet 124 is partially obstructed by a chute or door 126*b*, which will be described in more detail below), and the second position can be the nozzle 120 position after a maximum counter-clockwise rotation about the nozzle axis n (as depicted in FIG. 1C). FIG. 1B depicts the nozzle 120 in an example first position, and FIG. 1C depicts the nozzle 120 is an example second position. The nozzle 120 position depicted in FIGS. 1A, 2 and 3 is a neutral position, where the nozzle 120 is unrotated relative to the nozzle axis n (rotated 0°). It is noted that, in the example of FIG. 1A, the nozzle outlet 124 is depicted as partially obstructed by a baffle or damper 126*a*, alternate to the chute/door 126*b* depicted in FIG. 1B, which will each be described in more detail below.

In various embodiments the rotational position of the nozzle outlet 124 about the nozzle axis n is adjustable by a user from 0° to 360°. In some embodiments the nozzle outlet 124 is configured to rotate 90° about the nozzle axis n. In such embodiments, the first position of the nozzle 120 can be about 45° clockwise and the second position of the nozzle 120 can be about 45° counter-clockwise. In some embodiments the nozzle outlet 124 is configured to rotate 140°-200° about the nozzle axis n. In some embodiments the nozzle outlet 124 is configured to rotate about 180° about the nozzle axis n. In such an embodiment the first position of the nozzle outlet 124 can be about 90° clockwise from the unrotated position and the second position of the nozzle outlet 124 can be about 90° counter-clockwise from the unrotated position.

In the example depicted, the nozzle outlet 124 can be configured to direct airflow generated by the fan assembly 110 outward radially from the nozzle axis n, in a general direction that is parallel to the horizontal plane p, which can be considered generally parallel to a relatively flat ground surface. In some embodiments, the nozzle outlet 124 directs airflow in a direction that has a vertical component and a horizontal component such that the general direction of airflow intersects the horizontal plane p.

In some embodiments, the nozzle 120 has components that enable a user to select the vertical component of the general direction of airflow through the nozzle outlet 124. For example, as depicted in FIG. 1A, the nozzle 120 can incorporate an adjustable damper or baffle 126a that is pivotably disposed in the nozzle outlet 124. While the damper 126a is depicted as having a hinge extending horizontally across an upper portion of the damper 126a, in some embodiments the hinge can extend horizontally across a central portion of the damper 126a. Another example, which is depicted in FIG. 1B, shows that the nozzle 120 can have a pivotable chute or door 126b coupled to the nozzle 120 over the nozzle outlet 124. Other configurations can also be used to allow a user to select a vertical component of the general direction of airflow. In some embodiments a vertical component of the general direction of airflow is not selectable by a user. In the example vehicle 100 depicted in FIG. 4, a baffle/damper/chute/door is omitted, and the nozzle 120 has a generally horizontal notch 128 defined towards the end of the nozzle 120 that is a portion of the nozzle outlet 124. A portion of the air blown through the nozzle outlet 124 passes through the notch 128, which establishes an airflow direction having a vertical component.

In embodiments where the general direction of airflow is selectable by a user, an actuator can be disposed on the vehicle 100 that is configured to actuate selection of the vertical component of the general direction of airflow through the nozzle outlet 124. The actuator can cause pivoting of the damper/baffle, or chute/door 126a, 126b to adjust the vertical component of the general direction of airflow. Such actuators will be described in more detail below.

The ability of the nozzle outlet 124 to rotate about a nozzle axis n that is orthogonal to the horizontal plane p has an advantage in that the angle of the nozzle outlet 124 relative to the ground does not vary based on the particular orientation of the nozzle 120 about the nozzle axis n. As such, generated airflow exiting the nozzle outlet 124 has relatively equal efficiency/power to blow debris in any particular radial direction.

In some examples, a transition housing 160 couples the fan housing 112 to the nozzle 120. The transition housing 160 has an inlet 162 that is in fluid communication with the fan outlet 113 of the fan housing 112 and an outlet 164 that is in fluid communication with the nozzle inlet 122. About the inlet 162, the transition housing 160 is coaxial with the rotor axis and the central axis (r) of the fan housing 112. About the outlet 164, the transition housing 160 is coaxial with the nozzle axis n. In this way, the transition housing 160 couples the fan assembly 110 and the nozzle 120 while accommodating their respective orientations. The nozzle 120 can be rotatably coupled to the transition housing 160.

In some embodiments, a first actuator 146 (FIG. 1A) is coupled to the vehicle 100. The first actuator 146 can allow an operator to dictate the selective rotation of the nozzle 120, and therefore the nozzle outlet 124, about the nozzle axis n. The first actuator 146 is selectively engageable and is configured to selectively actuate rotation of the nozzle 120. In some embodiments the first actuator 146 is manually triggered. The first actuator 146 can be a switch, a button, or the like.

In embodiments where the first actuator 146 is a switch, manually engaging the switch in a first direction can rotate the nozzle 120 in a first direction about the nozzle axis n and manually engaging the switch in a second direction can rotate the nozzle 120 in a second direction about the nozzle axis n. In some such embodiments, the switch is configured to be manually positioned in three positions: a position in the first direction, a position in a second direction, and a center position. In the center position the switch can be configured to stop rotation of the nozzle 120 in either direction. In some other embodiments the switch is limited to two positions: a position in the first direction and a position in the second direction. The switch can be a rocker switch, for example. In some embodiments the first actuator 146 is a switch that is a toggle switch.

In embodiments where the first actuator 146 is a button, manually engaging the button can cause rotation of the nozzle in a first direction and/or a second direction about the nozzle axis n. In some embodiments, manually engaging the button requires that an operator actively depress the button until the nozzle rotates to the desired position. In other embodiments, manually engaging the button allows an operator to depress the button and then release the button ("tapping" the button). In such embodiments, the button can be disengaged by depressing and releasing (tapping) the button a second time. Other configurations are certainly contemplated, as well.

In some embodiments, the first actuator 146 is disposed on the first handle 142. The first actuator 146 can be disposed on the first handle 142 in a number of locations, but in embodiments consistent with the current figures, the first actuator 146 is disposed on an end of the first handle 142. The first actuator 146 is disposed on a distal end of the first handle 142, where the "distal" end is the end that is relatively distant from the control system 140 and/or the vehicle 100. In some embodiments the first actuator 146 can be disposed on the first handle 142 at another location, such as an intermediate position on the first handle 142 between the two ends of the handle 142. In some embodiments, the first actuator is disposed elsewhere on the vehicle 100 that is configured to be within reach of the vehicle operator, such as a foot switch.

Some embodiments incorporate a second manually engageable actuator 148 that is configured to selectively actuate rotation of the nozzle 120 about the nozzle axis n. The second actuator 148 can be configured consistently with the discussion above with respect to the first actuator 146, although the first actuator 146 and the second actuator 148 can have different or similar configurations. The second actuator 148 can be disposed on the vehicle 100 consistently with the discussion above with respect to the position of the first actuator 146 on the vehicle 100. In some embodiments the second actuator 148 is disposed on the second handle 144. The first actuator 146 can be disposed on the first handle 142 at a different or similar location compared to the position of the second actuator 148 on the second handle 144. The second actuator 148 can be disposed on a distal end of the second handle 144.

In some embodiments incorporating a first actuator 146 and a second actuator 148, the first actuator 146 is configured to selectively actuate rotation of the nozzle in a first direction about the nozzle axis n and the second actuator 148 is configured to selectively actuate rotation of the nozzle 120 in a second direction about the nozzle axis n. In some examples the first actuator 146 is a button and the second actuator 148 is a button and depressing the first actuator 146 actuates rotation of the nozzle in a clockwise direction relative to the operator and depressing the second actuator 148 actuates rotation of the nozzle 120 in a counterclockwise direction relative to the operator. In another example, the first actuator 146 is a toggle switch having two switch positions each defining a different direction of nozzle 120 rotation about the nozzle axis n, the second actuator 148 is a button, and depressing the second actuator 148 actuates the rotation of the nozzle 120 in the direction of rotation defined by the switch position of the first actuator 146.

In some embodiments one of the first actuator 146 or the second actuator 148 is configured to selectively actuate rotation of the nozzle 120 in a first direction and a second direction about the nozzle axis n to select the general radial direction of airflow from the nozzle outlet 124. In some such embodiments, the other of the first actuator 146 or the second actuator 148 is configured to allow a user to select the vertical component of the general direction of airflow from the nozzle outlet 124. For example, the first actuator 146 or the second actuator 148 can be configured to pivot a baffle 126a (FIG. 1A) or chute 126b (FIG. 1B) disposed in the nozzle outlet 124 to select the vertical component of the general direction of airflow from the nozzle outlet 124. In some embodiments a second actuator 148 can be omitted.

Various types of drive assemblies can be incorporated on the vehicle to drive rotation of the nozzle 120. In various embodiments, a belt drive assembly 170 is in operative communication with the first actuator 146 (FIG. 1A) to selectively rotate the nozzle 120. In some embodiments incorporating a second actuator 148, the belt drive assembly 170 is in operative communication with the second actuator 148. The belt drive assembly 170 is partially visible in FIGS. 2 and 3, and more clearly visible in FIG. 4, which is a third perspective view of the vehicle 100. The belt drive assembly 170 mechanically engages the nozzle 120 to drive rotation of the nozzle 120. In various embodiments, the belt drive assembly 170 has a belt 172. The belt 172 can be disposed about the nozzle 120 and in frictional engagement with the nozzle 120. In particular, the belt 172 can frictionally engage an outer surface of the nozzle 120.

The nozzle 120 can be configured to rotate from the first position (such as depicted in FIG. 1B to the second position (such as depicted in FIG. 1C), as has been discussed above. The belt drive assembly 170 mechanically engages the nozzle 120 to selectively rotate the nozzle from the first position to the second position. More particularly, the belt 172 disposed about the nozzle 120 is in frictional engagement with the nozzle from the first position to the second position.

The belt drive assembly 170 can have a drive pulley 174 (FIG. 4) that is in frictional engagement with the belt 172. The drive pulley 174 can be configured to transmit rotational force from a motor 176, such as an electric motor visible in FIG. 5, to the belt 172, and the belt 172 is configured to transmit rotational force to the nozzle 120. There is generally static friction between the belt 172 and the nozzle 120 when the nozzle is between the first position and the second position.

While the example embodiments disclosed herein reflect a belt drive assembly 170, in some other embodiments the nozzle can be rotated by other types of drive assemblies such as a gear drive assembly. Regardless of the particular type of drive assembly used to rotate the nozzle, the first actuator 146 (and the second actuator 148, if there is one) is in operative communication with such drive assembly such that an operator can selectively rotate the nozzle about a nozzle axis.

In various examples, the vehicle 100 has a limiting element 132 that is configured to restrict rotation of the nozzle 120 to a range from the first position to the second position. In embodiments consistent with the current example, a crossbar 132 (FIG. 1A) of the vehicle frame 130 extends behind the nozzle 120 and obstructs rotation of the nozzle 120 beyond a particular angle from the neutral position in each direction (counterclockwise and clockwise). More particularly, the crossbar 132 restricts rotation of the nozzle to a range from the first position (FIG. 1B) to the second position (FIG. 1C). If a user actuates the belt drive assembly 170 in such a way that the nozzle 120 presses into the crossbar 132, the belt 172 slips across the surface of the nozzle 120 as the belt 172 is translated and the nozzle 120 remains stationary until the user stops actuation.

The limiting element can be alternate features and combinations of features. In some embodiments, the limiting element can be a structural element of the fan housing 112 that restricts rotation of the nozzle 120. In some embodiments, the limiting element can be an electrically controlled stop. In various embodiments, the limiting element can be adjustable, such as where the rotation range of the nozzle 120 is programmable or where the limiting element is an adjustable structural component, such as a moveable pin.

In some embodiments, the belt drive assembly 170 incorporates a disengagement feature that is configured to operatively decouple the belt drive assembly 170 from the nozzle 120 at the first position (FIG. 1B) and the second position (FIG. 1C). For example, the vehicle 100 can incorporate limit switches that are each triggered by the maximum rotation of the nozzle 120 in each direction. Some example limit switches can remove power to the belt drive assembly 170. In some such examples, power can be restored by the user engaging an actuator to rotate the nozzle 120 in the opposite direction.

Fan assemblies incorporated in the vehicles disclosed herein can be a variety of different types of fans and can be selectively operated through a variety of different types of drive assemblies. In some embodiments the fan assembly has an axial fan. In some embodiments the fan assembly has an impeller. In some embodiments the fan assembly incorporates a turbine blower, an example of which will now be described.

Figure 6:
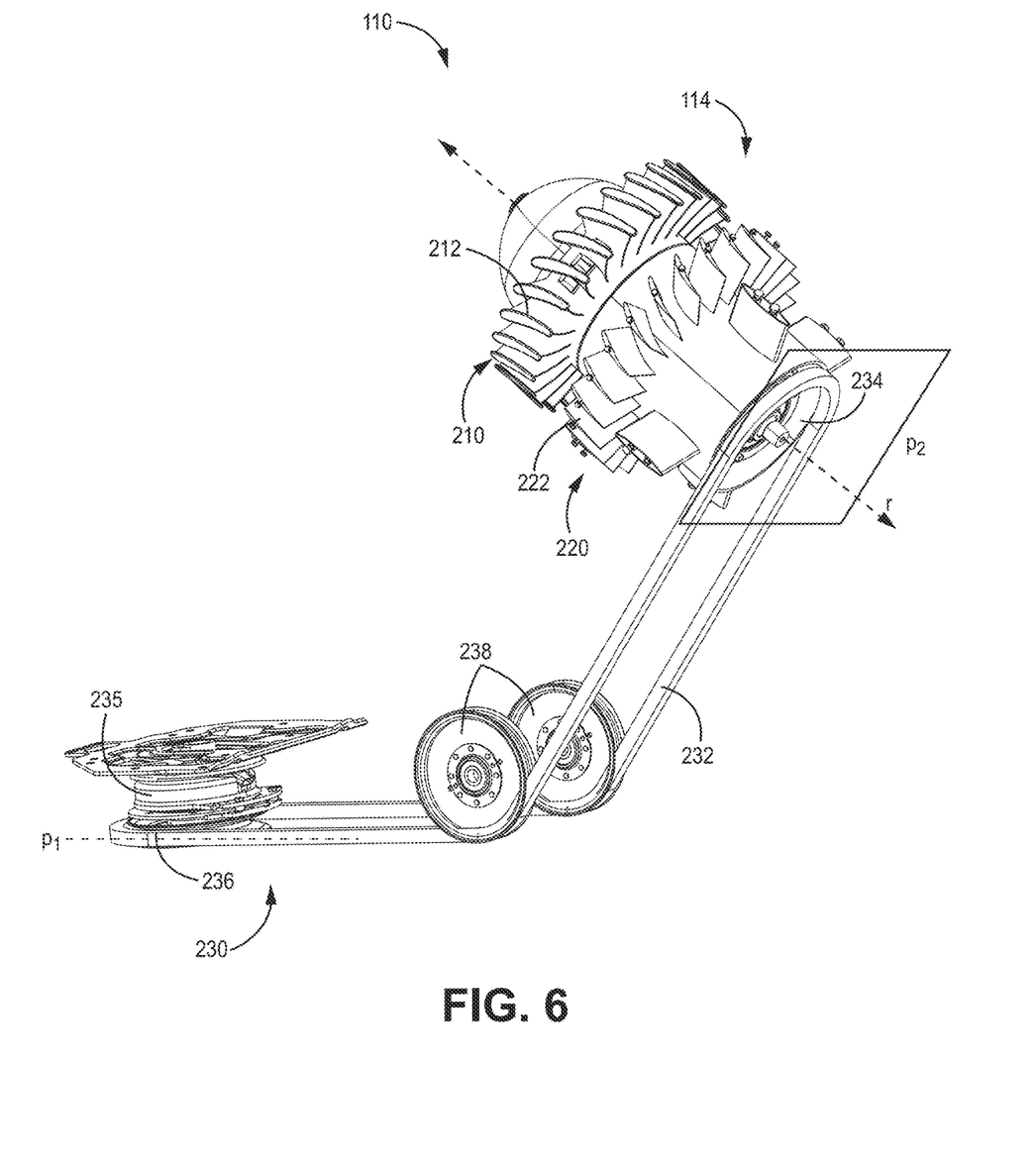
FIG. 6 is a perspective view of an example fan assembly consistent with some embodiments.

FIG. 6 depicts a portion of an example fan assembly 110 consistent with previous figures, except that the fan housing 112 (FIG. 1A) is omitted so that the fan 114 is visible. The fan 114 can be consistent with a turbine blower in various embodiments, meaning that the fan 114 has a rotor section 210 and a stator section 220. Each of the rotor section 210 and stator section 220 has a series of curved blades or vanes extending radially outward from the rotor axis r. Rotor blades 212 in the rotor section 210 are rotatable as a group about the rotor axis r. Stator blades 222 in the stator section 220 are fixed in place. As the rotor blades 212 rotate, air is drawn into the fan inlet 111 (FIG. 1A), and axially extending airflow is projected through the stator section 220 and through the fan outlet 113 (FIG. 1A).

Figure 4:
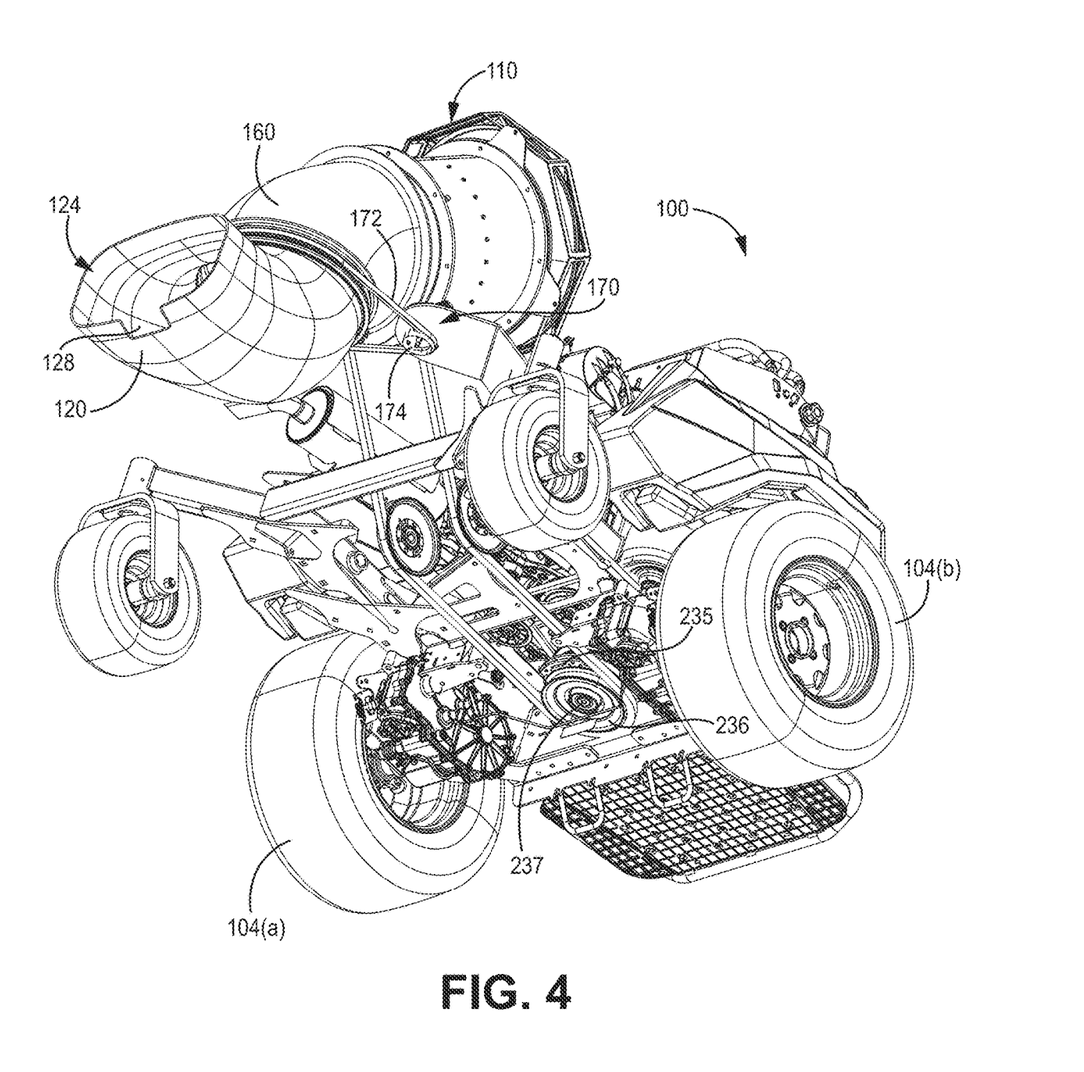
FIG. 4 is a third perspective view of the example vehicle.
Figure 5:
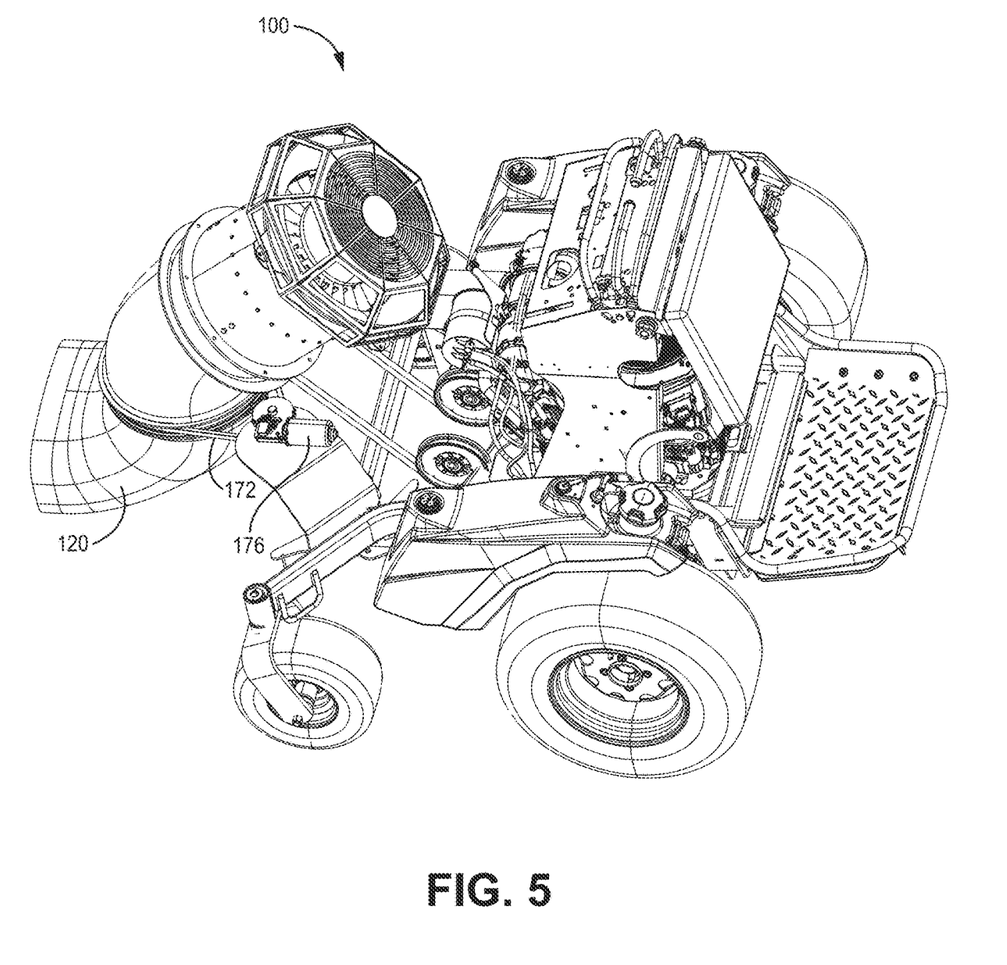
FIG. 5 is a fourth perspective view of the example vehicle.

A fan drive system 230 can be configured to drive the fan 114. The fan drive system 230 can have a drive belt 232 in frictional engagement with the rotor section 210. Here the drive belt 232 is disposed about a driven pulley 234 fixed to the rotor section 210 and the drive belt 232 frictionally engages the driven pulley 234. The drive belt 232 is also disposed about a driving pulley 236 to frictionally engage the driving pulley 236. The driving pulley 236 is in rotatable communication with a drive shaft 237 (FIG. 4) that can be mechanically coupled to the prime mover of the vehicle 100 (FIG. 1A) via the clutch 235 (FIG. 4). In some embodiments the fan drive system 230 can be characterized as a mule drive because idler pulleys 238 allow the drive belt 232 to frictionally engage the driving pulley 236 in a first plane $p_1$ and the driven pulley 234 in a second plane $p_2$ oblique to the first plane $p_1$ (FIG. 6).

It should also be noted that, as used in this specification and the appended claims, the phrase "configured" describes a system, apparatus, or other structure that is constructed or adapted to perform a particular task or adopt a particular configuration. The word "configured" can be used interchangeably with similar words such as "arranged", "adapted", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A debris management vehicle comprising:
   a vehicle frame;
   a fan assembly coupled to the vehicle frame, wherein the fan assembly has a rotor axis oriented obliquely to a horizontal plane; and
   a nozzle defining:
      a nozzle inlet in fluid communication with an outlet of the fan assembly; and
      a nozzle outlet, wherein the nozzle outlet is rotatable about a nozzle axis that is orthogonal to the horizontal plane when the rotor axis is oriented obliquely to the horizontal plane.

2. The debris management vehicle of claim 1, further comprising a standing platform connected to the vehicle frame, the standing platform adapted to support a standing operator.

3. The debris management vehicle of claim 1, the fan assembly further comprising a fan housing coupled to the vehicle frame, wherein the nozzle is rotatably disposed relative to the fan housing.

4. The debris management vehicle of claim 3, wherein the fan housing has a central axis that is coaxial with the rotor axis of the fan assembly.

5. The debris management vehicle of claim 1, further comprising a mule drive operatively coupled to the fan assembly.

6. The debris management vehicle of claim 1, further comprising a first handle and a first actuator disposed on the first handle, wherein the first actuator is manually engageable and is configured to actuate rotation of the nozzle about the nozzle axis.

7. The debris management vehicle of claim 6, further comprising a belt drive in operative communication with the first actuator, wherein the belt drive is configured to selectively rotate the nozzle from a first position to a second position.

8. The debris management vehicle of claim 7, wherein the belt drive is disposed about the nozzle to frictionally engage the nozzle.

9. The debris management vehicle of claim 7, further comprising a limiting element configured to restrict rotation of the nozzle to a range from the first position to the second position.

10. The debris management vehicle of claim 6, further comprising a second handle and a second actuator disposed on the second handle, wherein the second actuator is manually engageable and is configured to actuate rotation of the nozzle about the nozzle axis.

11. The debris management vehicle of claim 10, wherein the first actuator is configured to selectively actuate rotation of the nozzle in a first direction about the nozzle axis and the second actuator is configured to selectively actuate rotation of the nozzle in a second direction about the nozzle axis.

12. The debris management vehicle of claim 1, wherein the nozzle outlet is configured to rotate 90 degrees about the nozzle axis.

13. The debris management vehicle of claim 1, wherein the fan assembly comprises an axial fan.

14. The debris management vehicle of claim 1, wherein the fan assembly comprises an impeller.

15. The debris management vehicle of claim 1, wherein at least a portion of the fan assembly extends over the vehicle frame.

16. A debris management vehicle comprising:
   a vehicle frame;
   a first handle and a second handle coupled to the vehicle frame, wherein the first handle and second handle are translatable relative to the vehicle frame;
   a first drive wheel and a second drive wheel disposed on the vehicle frame, wherein translation of the first handle controls the first drive wheel and translation of the second handle controls the second drive wheel;
   a fan assembly coupled to the vehicle frame, wherein the fan assembly has a fan housing and a fan disposed in the fan housing, wherein the fan housing defines a fan outlet;
   a nozzle coupled to the fan housing, wherein the nozzle defines a nozzle inlet and a nozzle outlet, wherein the nozzle inlet is in fluid communication with the fan outlet and the nozzle is rotatable about a nozzle axis orthogonal to a horizontal plane; and
   a first manually engageable actuator disposed on the first handle, wherein the first actuator is configured to selectively actuate rotation of the nozzle about the nozzle axis.

17. The debris management vehicle of claim 16, further comprising a second manually engageable actuator disposed on the second handle, wherein the second actuator is configured to selectively actuate rotation of the nozzle about the nozzle axis.

18. The debris management vehicle of claim 17, wherein the first actuator is configured to selectively actuate rotation of the nozzle in a first direction about the nozzle axis and the second actuator is configured to selectively actuate rotation of the nozzle in a second direction about the nozzle axis.

19. The debris management vehicle of claim 16, further comprising a standing platform connected to the vehicle frame, the standing platform configured to support a standing operator.

20. The debris management vehicle of claim 16, wherein the fan has rotor axis oriented obliquely to the horizontal plane.

21. The debris management vehicle of claim 16, further comprising a mule drive operatively coupled to the fan.

22. The debris management vehicle of claim 16, wherein the nozzle is configured to rotate 90 degrees.

23. The debris management vehicle of claim 16, wherein the nozzle is rotatably disposed relative to the fan housing.

24. The debris management vehicle of claim 16, wherein the fan has a rotor axis and the fan housing has a central axis that is coaxial with the rotor axis of the fan.

25. The debris management vehicle of claim 16, further comprising a belt in operative communication with the first actuator, wherein the belt is configured to selectively rotate the nozzle from a first position to a second position.

26. The debris management vehicle of claim 25, wherein the belt is disposed about the nozzle to frictionally engage the nozzle.

27. The debris management vehicle of claim 25, further comprising a limiting element configured to restrict rotation of the nozzle to a range from the first position to the second position.

28. The debris management vehicle of claim 16, wherein the fan is an axial fan.

29. The debris management vehicle of claim 16, wherein the fan comprises an impeller.

30. A debris management vehicle comprising:
a vehicle frame;
a first drive wheel and a second drive wheel each coupled to the vehicle frame;
a fan assembly coupled to the vehicle frame, wherein the fan assembly has a fan housing defining a fan outlet, an impeller having a rotor axis oriented obliquely to a horizontal plane, and a mule drive operatively coupled to the impeller;
a nozzle coupled to the fan assembly, wherein the nozzle defines an inlet in fluid communication with the fan outlet, and a nozzle outlet, and wherein the nozzle is rotatable relative to the fan housing about a nozzle axis orthogonal to a horizontal plane when the rotor axis is oriented obliquely to the horizontal plane;
a belt drive assembly configured to selectively rotate the nozzle between a first position and a second position, wherein the belt drive assembly comprises a belt disposed about the nozzle and in frictional engagement with the nozzle between the first position and the second position;
a first handle coupled to the vehicle frame, wherein the first handle is in operative communication with the first drive wheel;
a first manually engageable actuator disposed on the first handle, wherein the first actuator is configured to selectively actuate rotation of the nozzle about the nozzle axis via the belt drive assembly;
a second handle coupled to the vehicle frame, wherein the second handle is in operative communication with the second drive wheel; and
a second manually engageable actuator disposed on the second handle, wherein the second actuator is configured to selectively actuate rotation of the nozzle about the nozzle axis via the belt drive assembly, wherein the first actuator is configured to selectively actuate rotation of the nozzle in a first direction about the nozzle axis and the second actuator is configured to selectively actuate rotation of the nozzle in a second direction about the nozzle axis.

\* \* \* \* \*